United States Patent [19]

Lipscher et al.

[11] Patent Number: 4,763,351
[45] Date of Patent: Aug. 9, 1988

[54] COMPUTER SECURITY SYSTEM

[76] Inventors: Bernard N. Lipscher; Kevin G. Coleman, both of 1342 Grant St. Station, Pittsburgh, Pa. 15230

[21] Appl. No.: 726,619

[22] Filed: Apr. 24, 1985

[51] Int. Cl.⁴ .............................................. H04L 9/00
[52] U.S. Cl. ...................................... 379/95; 380/23; 380/25
[58] Field of Search ........................ 178/22.08, 22.09; 179/2 EA, 2 DP, 2 CA; 379/95, 96; 380/25, 23

[56] References Cited

U.S. PATENT DOCUMENTS

| | | | |
|---|---|---|---|
| 3,516,062 | 6/1970 | Spraker | 179/2 DP |
| 3,647,972 | 3/1972 | Glover et al. | 179/2 CA |
| 3,665,162 | 5/1972 | Yamamoto et al. | 179/2 CA |
| 3,697,693 | 10/1972 | Deschenes et al. | 179/2 DP |
| 3,938,090 | 2/1976 | Borison et al. | 235/380 |
| 3,984,637 | 10/1976 | Caudill et al. | 178/22.08 |
| 4,182,933 | 1/1980 | Rosenblum | 178/22.08 |
| 4,310,720 | 1/1982 | Check, Jr. | 178/22.08 |
| 4,430,728 | 2/1984 | Beitel et al. | 178/22.08 |
| 4,469,918 | 9/1984 | Cripps | 179/2 EA |
| 4,531,023 | 7/1985 | Levine | 380/25 |
| 4,532,377 | 7/1985 | Zink | 379/96 |

Primary Examiner—Salvatore Cangialosi
Assistant Examiner—Aaron J. Lewis
Attorney, Agent, or Firm—Bernard, Rothwell & Brown

[57] ABSTRACT

A computer security system employs a first telephone line for controlling a security unit which connects a second telephone line to the computer. Each authorized user must have a user security unit generating a control signal, such as an audio signal modulated by a pulse signal having a selectable pulse frequency, pulse duration and/or duration between pulses.

7 Claims, 2 Drawing Sheets

COMPUTER SECURITY SYSTEM

TECHNICAL FIELD

The present invention relates to security systems for computers accessible through a telephone switching system, and particularly to systems for preventing access to the computers by unauthorized callers.

BACKGROUND ART

The prior art, as exemplified in U.S. Pat. Nos. 3,938,090, 4,310,720 and 4,430,728, contains a number of security systems for preventing unauthorized access to central or host computers connected to a public telephone system. Previous security systems have employed data encryption schemes, secret access codes, and access limitations and alarms. Such prior art security systems employ either a main computer to analyze the incoming access codes or data or employ a separate security computer which prevents connection of the telephone line to the computer until proper access codes have been received on the telephone line. These prior art types of security systems have been defeated by unauthorized callers employing personal computers as terminals. This sometimes resulted in destruction of data, theft of data, unauthorized fund transfer, etc. With increasing use of computers for banking services, credit rating data, private business information, and the like, there exists a need for a relatively simple and inexpensive security system to prevent computer access by an unauthorized caller.

SUMMARY OF THE INVENTION

The invention is summarized in a first aspect by a security system requiring two separate telephone lines for accessing a computer. One telephone line is utilized to carry a predetermined control signal to a computer security unit operating a relay to complete a circuit connecting the second telephone line to the computer. Each authorized user has a security unit for generating and transmitting the predetermined control signal over the first telephone line so that the user can access the computer through the second telephone line.

In another aspect of the invention, a security system employs a security unit at each authorized caller and a security unit at the called computer wherein each security system includes a continuous pulse generator for generating pulses having a selected pulse duration and/or a selected duration between pulses and the security unit at the called computer requires an incoming continuous pulse signal with pulse durations and/or durations between pulses matching the pulses of the pulse generator at the called computer prior to connecting the computer to the telephone line.

An object of the invention is to provide an improved security system for computers which can be accessed through a telephone switching network.

Another object of the invention is to provide a computer security system which has a hardware facility for preventing access by unauthorized personnel.

One advantage of the invention is that employment of a hardware generated signal on a second telephone line to control connection of a first telephone line to a computer limits the ability of a single line telephone subscriber for accessing the computer.

Another advantage of the invention is that matching of pulse width and duration between pulses is virtually impossible for an unauthorized caller to thus render access to the computer secure.

One feature of the invention is that a relatively simple and inexpensive circuit can be employed for security to prevent access to a computer.

Other objects, advantages and features of the invention will be apparent from the following description of the preferred embodiment taken in conjunction with the following drawings.

DESCRIPTION OF THE PREFERRED EMBODIMENT

Figure 1:
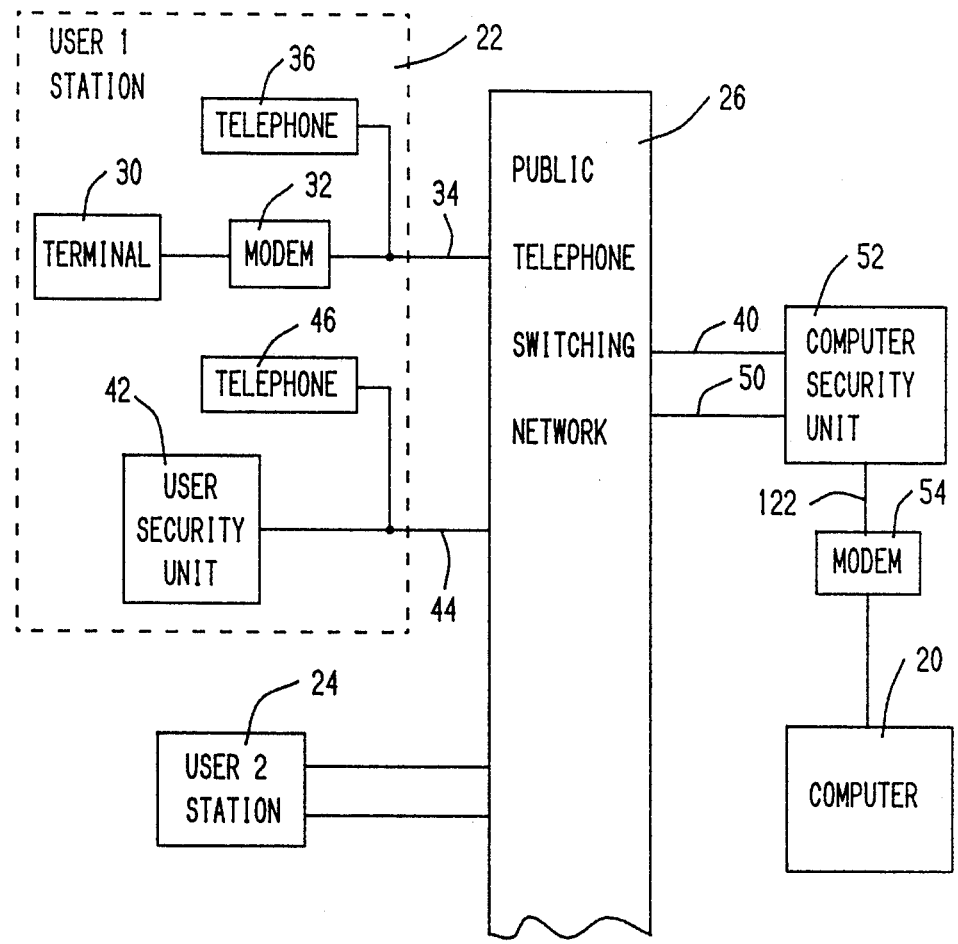
FIG. 1 is a block diagram illustrating a security system for a computer connected to a public phone system in accordance with the invention.

As illustrated in FIG. 1, one embodiment of the invention includes a computer 20 which can be used by one of a plurality of authorized users, such as user station 22 and user station 24, through a public telephone switching network 26. Each user such as user 22 includes a terminal 30 which may be a display terminal, printing terminal, computer, or other terminal device connected by a modem 32 to a first telephone line 34 of the network 26. A standard telephone dial or DTMF generator, such as a conventional telephone 36 connected to the line 34 is utilized to call a telephone line 40 over which communications are to pass between the computer 20 and the terminal 30. Each user station also includes a user security unit 42 connected to a separate telephone line 44 which is also connected to a standard dial or DTMF generator, such as conventional telephone 46 for calling a telephone line 50 of the network 26. The user security unit 42 generates a signal which is applied on line 50 to control a computer security unit 52 which connects the line 40 via a modem 54 to the computer 20.

The telephone lines 34, 40, 44 and 50 are conventional paired telephone lines, each including a TIP and RING line. Each pair of telephone lines is represented by a single line.

Figure 2:
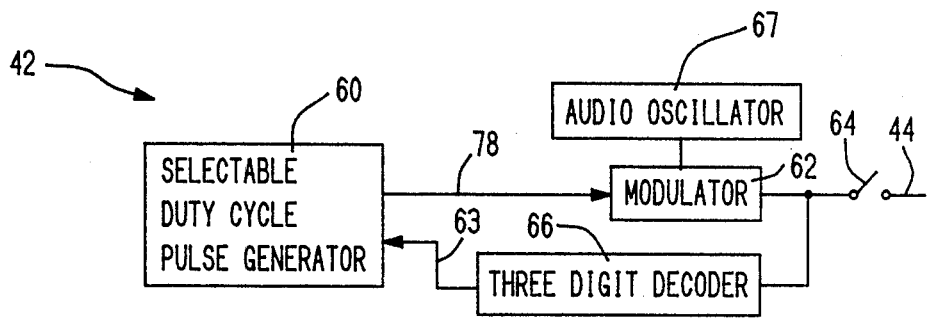
FIG. 2 is a block diagram of a user security unit in the system of FIG. 1.

As shown in FIG. 2, the user security unit 42 includes a selectable duty cycle pulse generator 60 connected to a modulator 62 which can be connected by a switch 64 to the telephone line 44. The selectable duty cycle pulse generator 60 is controlled or initiated by a signal on a line 63 from a decoder, such as a three-digit DTMF decoder 66 which is also connected by switch 64 to the line 44, to produce a square wave or pulse output which modulates an audio carrier signal from oscillator 67 in the modulator 62. Preferably the audio carrier signal is a frequency, for example 1200 Hz, which differs from normal frequencies employed by data modems. The modulator 62 can employ frequency modulation, phase modulation, frequency shift key modulation, amplitude modulation or any other type of modulation suitable for producing a modulated audio signal capable of being transmitted on telephone lines.

Figure 4:
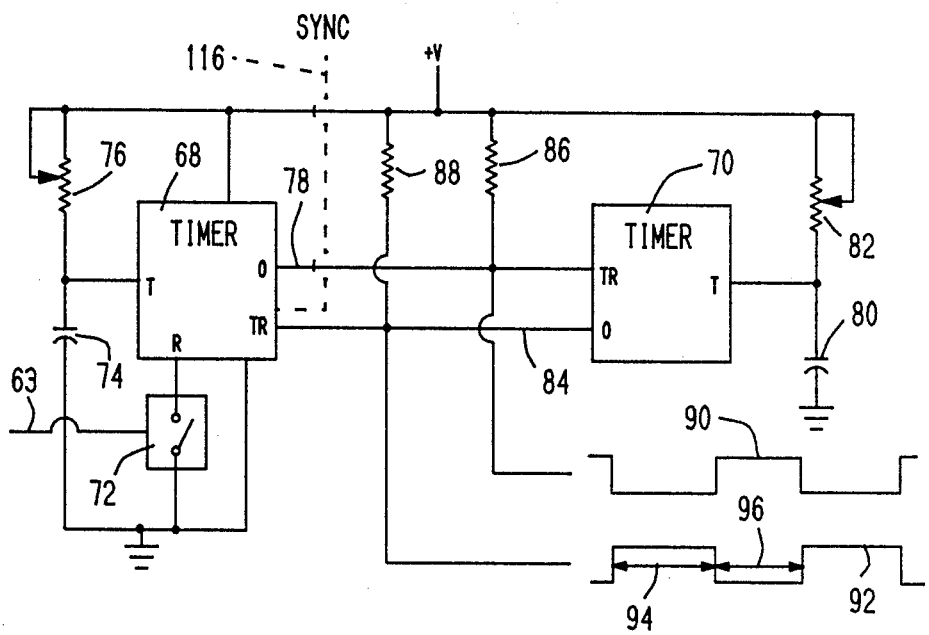
FIG. 4 is a circuit schematic of a selectable duty cycle pulse generator for use in the user security unit and host security unit of the circuits of FIGS. 1-3.

One type of selectable duty cycle generator is illustrated in FIG. 4 and includes a pair of timer circuits, such as type 555 timers 68 and 70. A reset input to the timer 68 is controlled by a relay or electronic switch 72 operated by line 63 to initiate operation of the timer 68 and begin charging of a capacitance 74 through a variable resistance 76. When the junction between resistance 76 and capacitance 74, connected to the timing and discharge input of the timer 68, reaches the control voltage level of the timer, an output is produced on output line 78 to operate the timer 70. Operation of the timer 68 also results in discharge of the capacitance 74. Operation of the timer 70 results in charging of a capacitance 80 through a variable resistance 82 until the control voltage of the timer 70 is reached to produce an output on line 84 which then again operates timer 68. The output lines 78 and 84 of the timers 68 and 70 are biased positive by respective resistances 86 and 88. As shown by the wave forms 90 and 92, complementary square wave or continuous pulse signals are generated on the outputs 78 and 84. The wave form 92 has a pulse duration shown by the line 94 which is determined by the values of the variable resistance 76 and capacitance 74 and has a duration between pulses as shown by the line 96 which is determined by the values of the variable resistance 82 and the capacitance 80. Thus, the wave forms 90 and 92 can be selected to have desired pulse durations and durations between pulses. Also the frequency of the pulses will be determined by the pulse duration and the duration between pulses; a pulse frequency in the range of 100 to 450 Hz is an example of a suitable frequency.

Figure 3:
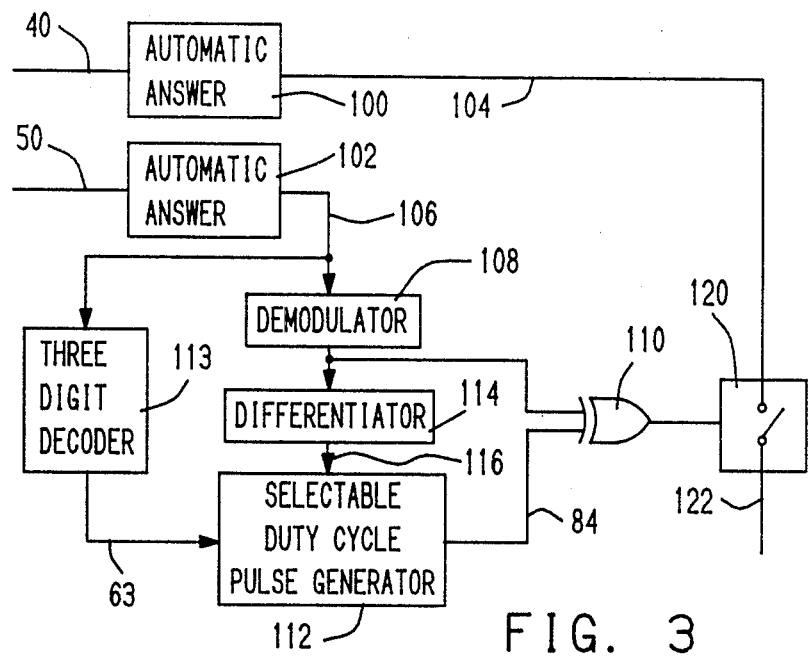
FIG. 3 is a block diagram of a host security unit in the circuit of FIG. 1.

The computer security unit 52, as shown in FIG. 3 includes automatic answer units 100 and 102 connected to the respective telephone lines 40 and 50 for responding to ring signals to produce off-hook line conditions and to connect the telephone lines 40 and 50 to respective lines 104 and 106. Line 106 is connected to a demodulator 108 which demodulates the pulse modulated audio signal from telephone line 44 to reproduce the pulse signal from generator 60. This pulse signal is applied to one input of a logic circuit such as an exclusive OR gate 110 which has its other input connected to a output of a selectable duty cycle pulse generator 112. The selectable duty cycle pulse generator 112 is controlled or initiated by a signal from a decoder 113, sensing the same code as the decoder 66, and is substantially similar to the selectable duty cycle pulse generator 60 except that a differentiator 114 connected to the output of the demodulator 108 supplies a sync pulse on sync line 116, shown as a dashed line in FIG. 4. This sync line 116 is connected to the TR input of timer 68 and the line 84 is not connected to the TR input of timer 68 in the generator 112. The output of the exclusive OR gate 110 operates a relay or electronic switch 120 connecting the line 104 to a line 122 which, as shown in FIG. 1, is connected to the modem 54. The electronic relay 120 is normally open to disconnect the input telephone line 40 from the computer 20 except when the demodulated pulse signal from demodulator 108 corresponds almost exactly to the complement of the pulse signal produced by the selectable duty cycle pulse generator 112.

In order to permit error-free transmission through switch 120, differences between the pulses from demodulator 108 and the pulses from generator 112 must be less than the pass band of the modem 54. For example if the modem has an upper cutoff frequency of 2.5 K Hz, then any negative going pulse output from EXCLUSIVE-OR gate 110 must be less than about 0.4 milliseconds in duration. If the incoming pulses from demodulator 108 have pulse durations which differ from pulse durations of pulses from generator 112 by more than 0.4 milliseconds or have durations between pulses which vary by more than 0.4 milliseconds and particularly by more than about 0.8 milliseconds or about 3 milliseconds (for transmission rates of 1200 and 300 baud, respectively) then the switch 120 opens and closes at a rate sufficient to garble the transmission signals and produce errors preventing the caller from using the called computer.

Since the pulse durations, and durations between pulses of the pulse generators 60 and 112 can be variably set, it is possible to periodically change the settings of the variable resistances 76 and 82 in order to insure that only authorized users have access to the computer. An operator at the called computer station can monitor the pulse signals from demodulator 108 and generator 122, for example by a dual trace oscilloscope, and can instruct the calling station operator in adjusting the resistances 76 and 82. An unauthorized caller cannot readily match the pulse durations and durations between pulses since the unauthorized caller does not receive the signal from generator 112 and the wide possible variations in settings of the pulse widths and durations of pulses renders trial and error methods likely to be unsuccessful, particularly if an alarm or disabling means is employed to respond to improper input signals.

In operation of the security system of FIGS. 1-4, the operator at station 22 uses telephone 46 to call the telephone number corresponding to line 50. After hearing an indication that the answer device 102 has answered the ring, switch 64 is closed and the operator enters a three-digit code by means of the telephone 46. If the three-digit code corresponds to the preset number of the decoders 66 and 113, an output signal on lines 63 from the decoders operate switches 72 in the generators 60 and 112 to reset and start operation of the timers 68 and 70. The timers 68 and 70 alternately operate to produce a continuous signal having pulses with a pulse duration and a duration between pulses corresponding to the preset values of variable resistances 76 and 82. Since the signal on line 84 of the generator 112 is a complement of the signal on line 78 of the generator 60, the EXCLUSIVE-OR gate 110 produces a continuous signal to operate switch 120 to connect line 104 to the line 122 and modem 54. The operator at station 22 uses telephone 36 to call line 40 and to connect the terminal 30 to the computer 20.

While the above preferred embodiment employs user security units with pulse generators which are complementary to the pulse generator in a computer security unit at the computer, it is possible to use various other types of discrete signal generators to control operation of the computer security unit 52. For example, the computer security unit 52 can respond to a selected frequency or multi-frequency signal, or the security unit 52 can respond to a repetitive sequences of serial pulses which are serially coded. Also, digital timing techniques can be used to generate continuous pulse signals as an alternative to the described analog timers; for example, a crystal controlled digital timer or generator with selectable outputs can be used to operate a flip-flop to produce continuous pulse signals with a desired pulse duration and a desired duration between pulses.

The present security system by employing two separate telephone lines, one for data transmission and the other for computer security control eliminates the majority of potential unauthorized users, namely, those which have only one telephone line connected to the public telephone switching network 26. Further, the generation of a nonstandard modulated audio signal by dedicated hardware units, namely, the user security unit 42 and the computer security unit 52, renders the system unsuitable for break-in by individuals employing standard computer hardware.

Since many modifications, variations and changes in detail can be made to the above-described embodiment without departing from the scope and spirit of the invention, it is intended that all matter in the foregoing description and shown in the accompanying drawing be interpreted as illustrative and not in a limiting sense.

It is claimed:

1. A security system for a computer accessible through a telephone switching network, comprising
    electrically operable switch means having a normally open circuit for being connected in series with a first telephone line from the telephone network to the computer,
    a signal sensing circuit connectable to a second telephone line from the telephone network for responding to a predetermined signal on the second telephone line to operate the switch means to close the normally open circuit, and
    a user security unit for generating the predetermined signal and for transmitting the generated signal to the signal sensing circuit through a third telephone line to the telephone network to enable connection of a user terminal to the computer through a fourth telephone line to the telephone network.

2. A security system as claimed in claim 1 wherein the predetermined signal is a continuous periodic signal.

3. A security system as claimed in claim 2 where the predetermined signal has a predetermined frequency.

4. A security system as claimed in claim 1 wherein the user security unit includes a pulse generator for producing a periodic pulse signal, and a modulator connected to the pulse generator for producing the predetermined signal by modulation of an audio signal by the pulse signal; and wherein the signal sensing circuit includes a demodulator for producing the pulse signal from the modulated audio signal, and means for determining a predetermined condition of the pulse signal to operate the switch means.

5. A security system as claimed in claim 4 wherein the predetermined condition of the pulse signal includes a pulse duration.

6. A security system as claimed in claim 4 wherein the predetermined condition of the pulse signal includes a duration between pulses.

7. A security system as claimed in claim 4 wherein the predetermined condition of the pulse signal includes both pulse duration and a duration between pulses.

* * * * *